| United States Patent [19] | | [11] | 4,119,169 |
|---|---|---|---|
| Hopkins | | [45] | Oct. 10, 1978 |

[54] PUMP DRIVE FOR HYDROSTATIC MACHINES WITH EXTERNAL GEARS

[75] Inventor: Donald L. Hopkins, Joliet, Ill.

[73] Assignee: Caterpillar Tractor Co., Peoria, Ill.

[21] Appl. No.: 773,046

[22] Filed: Feb. 28, 1977

Related U.S. Application Data

[63] Continuation-in-part of Ser. No. 638,234, Dec. 8, 1975, abandoned.

[51] Int. Cl.² ............................................. B60K 17/10
[52] U.S. Cl. .......................... 180/66 R; 60/DIG. 10; 180/6.48
[58] Field of Search ............................ 180/66 R, 6.48; 60/DIG. 10, 484, 485, 486

[56] References Cited

U.S. PATENT DOCUMENTS

| 2,468,828 | 5/1949 | Kopp | 180/66 R |
|---|---|---|---|
| 2,996,135 | 8/1961 | Grabow | 180/66 R |
| 3,001,409 | 9/1961 | Von Fometti | 74/606 |
| 3,128,639 | 4/1964 | Hein et al. | 74/606 |
| 3,279,172 | 10/1966 | Kudo et al. | 60/484 |
| 3,526,288 | 9/1970 | Cryder et al. | 180/6.48 |
| 3,597,115 | 8/1971 | Jass | 417/313 |
| 3,698,265 | 10/1972 | Williams | 74/606 R |
| 3,709,312 | 1/1973 | McGough | 180/66 R |
| 3,797,599 | 3/1974 | Kostas | 180/66 R |
| 3,916,625 | 11/1975 | Holtkamp | 60/486 |

*Primary Examiner*—David M. Mitchell
*Attorney, Agent, or Firm*—Phillips, Moore, Weissenberger, Lempio & Majestic

[57] ABSTRACT

The invention is concerned with an improvement in a vehicle comprising using a first pair of gears external of a pump compartment structure thereof, each of a first pair of gears meshed with and driven by a drive gear; and a pair of pump drive shafts each drivingly connected to a respective one of said pair of gears passing into said pump compartment structure and driving a respective one of a pair of hydrostatic pumps.

10 Claims, 9 Drawing Figures

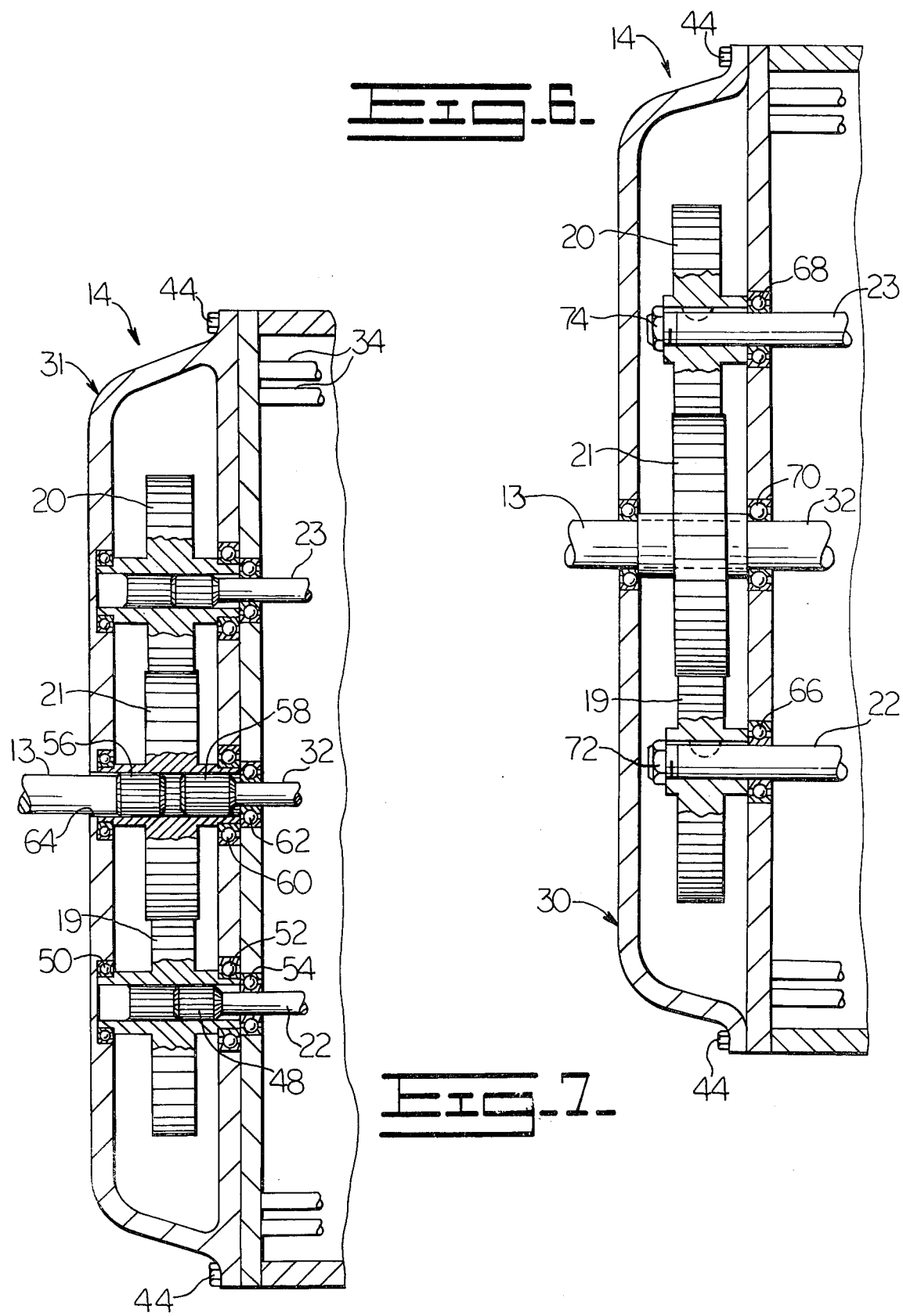

PUMP DRIVE FOR HYDROSTATIC MACHINES WITH EXTERNAL GEARS

CROSS-REFERENCE

This application is a continuation-in-part of copending application Ser. No. 638,234 filed Dec. 8, 1975, now abandoned.

BACKGROUND OF THE INVENTION

1. Field of the Invention

The invention relates to a hydrostatic drive train for a vehicle, and more particularly to the mounting and drive arrangement of the hydrostatic pumps employed in the hydrostatic drive transmission.

2. Prior Art

In the past, efforts to employ hydrostatic drive on a vehicle have often been directed towards simply replacing the conventional drive transmission of the vehicle with a hydrostatic drive. As a result, the hydrostatic pumps, motors and controls were located in a modified final drive case where they were inaccessible for adjustment and servicing.

Other past efforts have lead to the provision of a noncomplex and economical hydrostatic drive system for a vehicle in which the hydrostatic pumps are easily accessible and removable for servicing and adjustment. Such a system is taught for example in U.S. Pat. No. 3,797,599 which is assigned to the assignee of the present invention.

One problem which has existed with the prior art pump drive has been that the mechanical drive part thereof, i.e., the gears, have not always been sufficiently accessible for easy servicing and replacement. Further, in many instances, the gears which drive the hydrostatic pumps in the prior art apparatus have been located between the pumps whereby relatively complex null and gain control linkages have been needed to assure that the displacements of the hydraulic pumps can be simultaneously controlled.

Accordingly, it is an object of the present invention to provide an improved vehicle having hydrostatic pump means wherein the gears which drive said pump means are located externally of a compartment structure which houses said pump means.

It is a further object of the invention to provide a vehicle wherein relatively simple null and gain control linkage can be utilized.

These and other objects of the invention which will become apparent from reading the following description are accomplished as described in following.

SUMMARY OF THE INVENTION

The invention is concerned with an improvement in a vehicle which comprises a frame, ground engaging means for propelling the vehicle over the ground, an engine mounted on the frame and having a drive shaft with a drive gear driven thereby, said shaft extending from said engine, a pair of hydrostatic motor means for driving the ground-engaging means, conduit means communicating with the hydrostatic motor means, a hydrostatic drive pump compartment structure mounted on the frame, a pair of hydrostatic pump means disposed within said pump compartment structure, mechanical adjustment means for individually controlling the displacement of each of said pair of hydrostatic pump means, mechanical linkage means for simultaneously controlling the displacements of both of said pair of hydrostatic pump means and mechanical drive means disposed on said pump compartment structure for driving said hydrostatic pump means. The improvement of the invention comprises using as said mechanical drive means a first pair of gears each of said first pair of gears being meshed with and driven by the drive gear; means for removably mounting each of said first pair of gears externally to said pump compartment structure; a pair of pump drive shafts; means for removably drivingly connecting each of said pump drive shafts to a respective one of said pair of gears, said pump drive shafts passing into said pump compartment structure and driving a respective one of said pair of hydrostatic pump means using as said pair of hydrostatic motor means: a pair of hydrostatic motors mounted externally of said hydrostatic drive pump compartment adjacent to said ground-engaging means; and using as said conduit means: pipe means which interconnect said pair of hydrostatic motors each respectively with a respective one of said pair of hydrostatic pump means.

BRIEF DESCRIPTION OF THE DRAWINGS

The invention will be better understood by reference to the figures of the drawings wherein like numbers denote like parts throughout and wherein:

FIGS. 6 and 7 are more detailed views of the embodiments of FIGS. 5A and 5, respectively.

DETAILED DESCRIPTION OF THE PREFERRED EMBODIMENTS

Figure 1:
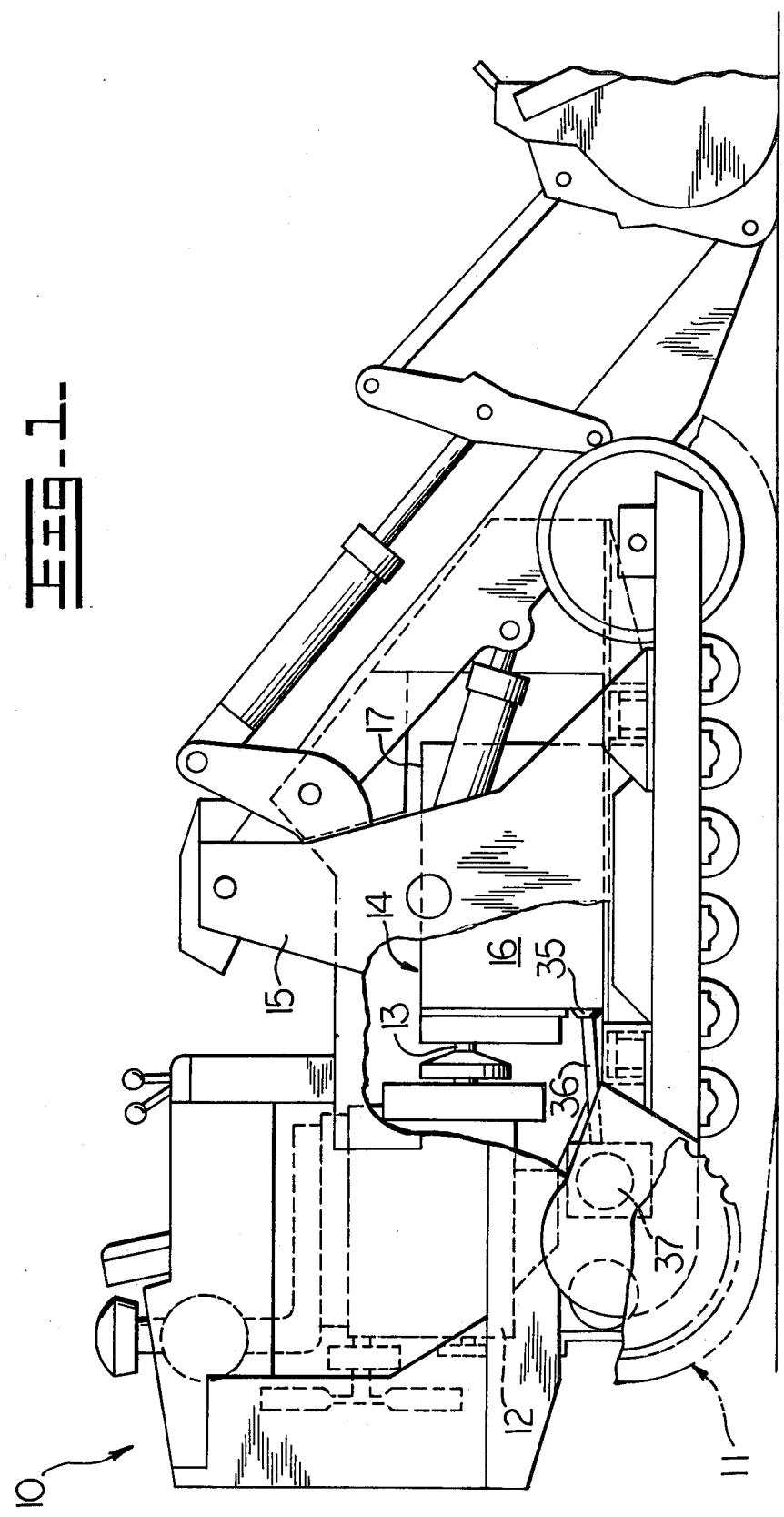
FIG. 1 is a partially sectioned side elevational view of a loader vehicle employing a hydrostatic transmission therein.

Referring to FIG. 1, a track type loader vehicle includes a frame 10 mounted on ground-engaging means, namely the endless tracks 11. A rear mounted engine 12 has a drive shaft 13 extending forwardly into a hydrostatic drive pump compartment or housing 14, mounted between frame members 15 which support the vehicles loader linkage and lift arms. It will be noted that although the pump compartment 14 is located between frame members 15, it is easily accessible from above and from the front of the vehicle.

Figure 2:
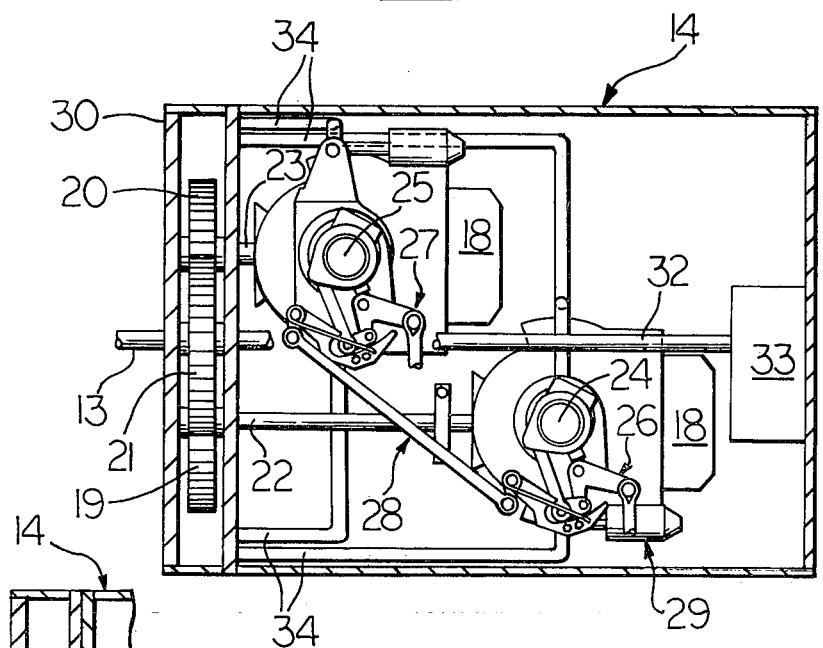
FIG. 2 is a sectioned top plan view of a hydrostatic drive train for such transmission illustrating one embodiment of the present invention.

The compartment includes upstanding walls 16, and a cover 17 which is easily removed to expose hydrostatic pump drive train components housed within the compartment for servicing and adjustment thereof. Referring to FIG. 2, such components comprise a pair of swivel-type reversible and variable displacement pumps 18 driven by a gear train. The gear train comprises a first pair of meshing gears 19 and 20 driven by a drive gear 21 which is itself driven by a drive shaft 13. A first pair of pump drive shafts 22 and 23 are driven by the first pair of gears 19 and 20 respectively to drive a respective one of the pumps 18. Each of the first pair of pump drive shafts is drivingly connected as by splining, keying or the like to a respective one of the first pair of gears. That is, the first shaft 22 is splined or keyed to the first gear 19 and the second shaft 23 is splined or keyed to the second gear 20.

A pair of servo valves 24 and 25 serve to control the displacement of the pumps 18, the one servo valve 24 controlling the displacement of the pump 18 which is powered by drive shaft 22 and the other servo valve 25 controlling the pump displacement of the pump 18 which is powered by the drive shaft 23. A pair of individual pump displacement controls 26 and 27 serve to mechanically adjust the servo valves 24 and 25 respectively and thereby balance the pumps 18. Mechanical linkage means, namely the linkage 28 serves to simultaneously control the pair of servo valves 24 and 25 and thus to simulatneously control both of the pumps 18. Activation of the linkage 28 can be accomplished through use of a hydraulically driven cylinder 29.

Figure 3A:
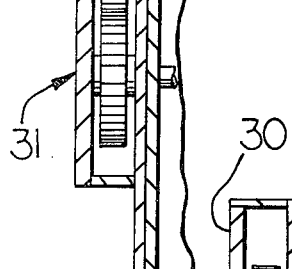
FIG. 3A is a partial view of an alternate embodiment of FIG. 3.
Figure 3:
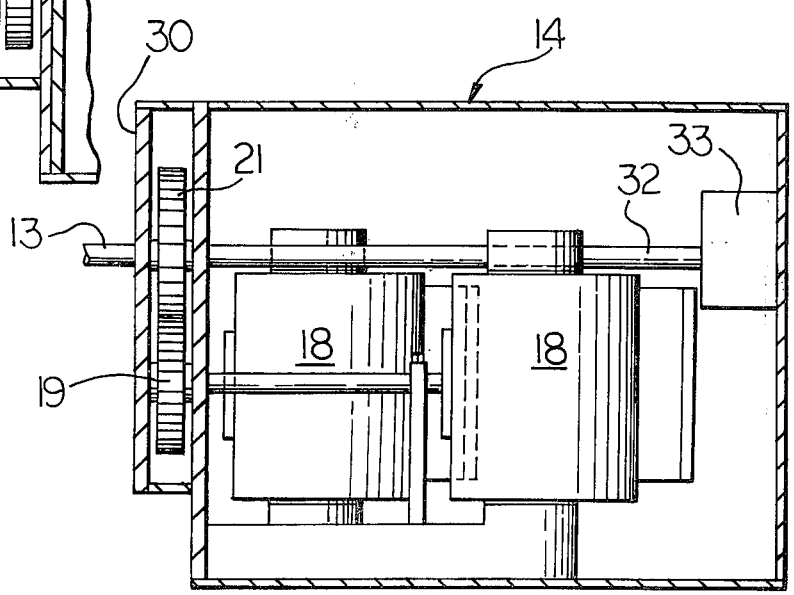
FIG. 3 is a sectioned side view of the embodiment illustrated in FIG. 2.
Figure 4:
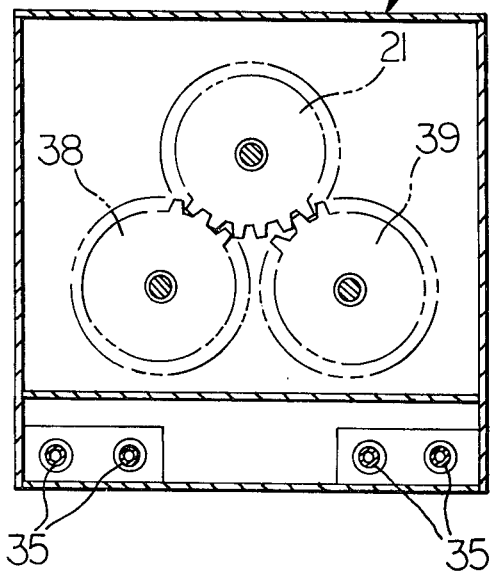
FIG. 4 is a sectioned end view illustrating mainly the gearing means of another embodiment of the invention.

As will be noted by reference to FIGS. 2, 3 and 4 each of the first pair of gears 19 and 20 and the drive gear 21 are located external of the compartment 14. This is a significant improvement over the prior art structure in that it provides easy access to the gears without the necessity for entering the compartment 14 and working therein with the attendant necessity to avoid disturbing the pumps 18 and tubing, other equipment or the like which may be included therein. FIGS. 2, 3 and 4 illustrate an embodiment of the invention wherein an end cap 30 serves to enclose the gears 19, 20 and 21. FIG. 3A illustrates an alternate embodiment of the invention wherein instead of using an end cap 30 which attaches to the exterior of the compartment 14, one uses a separate housing 31 and the entire housing 31 attaches to the compartment 14. This arrangement has the advantage that the gears can be removed as a whole and the housing 31 can then be replaced immediately while the gears therein are then individually replaced as for example at a factory or repair facility.

A shaft 32 connects drive gear 21 to a replenishing pump 33 mounted within a compartment 14. An implement pump, not illustrated, may be mounted outside the compartment and may be driven by the shafts 32 or a continuation thereof. Because of the good balance attained by powering the first pair of gears 19 and 20 by the drive gear 21 and also driving the replenishing pump 33 by the shaft 32, the pumps 18 are generally well balanced relative to one another and large adjustments in the individual controls 26 and 27 are generally not needed.

Fluid conduits 34 connect the pumps 18 to outlets 35, one of which is illustrated in FIG. 1, and thence via fluid pipes 36 which communicate with hydrostatic drive motors 37 of the vehicle. Thus, upon disconnecting drive shaft 13 from drive gear 21 and pipes 36 from outlets 35, the entire compartment 14, including the attached gearing within either the end cap 30 or the housing 31 and having the pumps 18 mounted therein may be removed as a unit from the vehicle to a work bench for maintenance and repair. Alternatively and as previously explained, the gears 19, 20 and 21 can be removed separately for maintenance and repair.

Figure 5A:
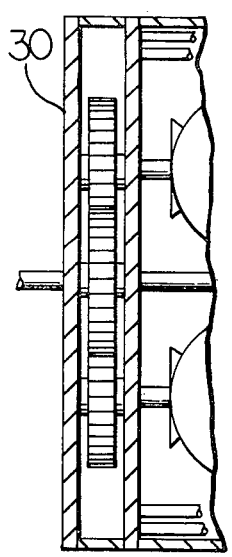
FIG. 5A is a partial view of an alternate embodiment of FIG. 5.
Figure 5:
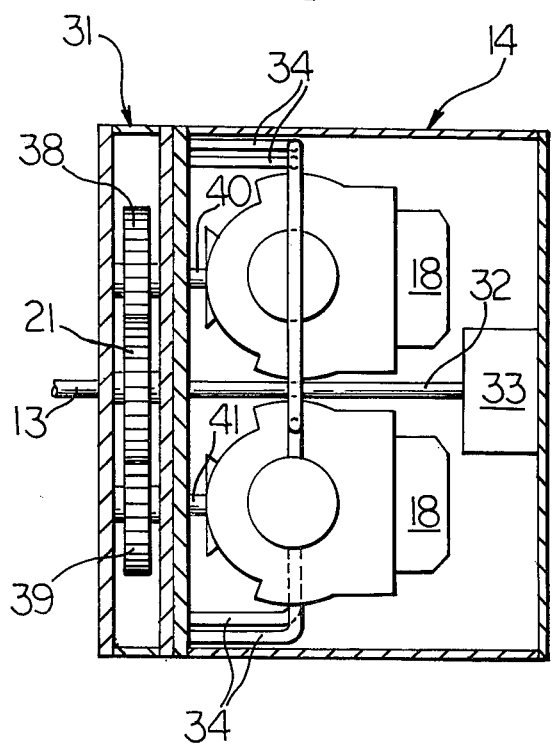
FIG. 5 is a sectioned side view of the embodiment illustrated in FIG. 4.

FIGS. 4 and 5 (FIG. 4 is common to all embodiments) illustrate an alternate embodiment of the present invention. In the embodiment illustrated in FIGS. 4 and 5 the drive gear 21 once again drives the first pair of gears, in this case the first pair of gears 38 and 39 in the removable housing. Alternately, as shown in FIG. 5A an end cap 30 on the compartment 14 can replace the housing 31. The first pair of gears 38 and 39 drive a first pair of pump drive shafts 40 and 41, respectively, which are substantially equal in length. As a result, the pumps 18 in this embodiment of the invention are aligned side by side. The linkage 28 is not shown in FIG. 5 for clarity although it normally would be used in this embodiment. The shaft 32 and the replenishing pump 33 serve the same purposes as the embodiment illustrated in FIGS. 2 and 3. Similarly, the fluid conduits 34 connect via the outlets 35 to the fluid pipe 36 just as described with respect to the embodiment of FIGS. 2 and 3. The individual components, that is the pumps 18, the fluid conduits 34, the replenishing pump 33 can be releasably secured within the compartment 14, and shafts 32, 40 and 41 in FIGS. 4 and 5 and the shafts 22 and 23 in FIGS. 2 and 3 along with the shaft 13 in each of the figures may be mounted in bearings with the gears being supported by the shafts in a conventional manner. For example, the pumps 18 are conventionally secured within compartment 14 by a plurality of bolts, upon removing the cover 17 and these bolts and disconnecting the conduits 34 from the pumps 18, both pumps can be easily removed from the compartment for servicing.

FIGS. 3, 3A, 5 and 5A illustrate only generally the attachment of the end caps 30 and separate housings 31 to the drive pump compartment or housing 14. Reference to FIG. 7 will illustrate particular structure for making the separate housing 31 of FIG. 3A and 5 removably secured to the compartment 14 and for making the gears 19, 20 and 21 removable from the shafts 22, 23, 13 and 32. Briefly, the separate housing is removably secured to the pump compartment 14 via bolts 44. The gear 19 is splined to an end 48 of the drive shaft 22. Appropriate bearings 50, 52 and 54 allow rotation of the gear 19 and of the shaft 22. The gear 20 and the shaft 23 are mounted similarly to the gear 19 and the shaft 22. The gear 21 is spliningly engaged with an end 56 of the drive shaft 13 and with an end 58 of the shaft 32. Appropriate bearings 60 and 62 allow rotation of the gear 21 and the shaft 32. The shaft 13 rotates within a bearing 64.

It is clear that when the bolts 44 are removed the separate housing 31 can simply be moved directly leftwardly in FIG. 6 whereby the shafts 22 and 23 will simply slide out of engagement with the gears 19 and 20 while the shaft 32 will likewise slide out of engagement with the gear 21. Thus it is clear that the entire separate housing 31 is removably secured to the drive pump compartment 14.

Referring to FIG. 6 there is illustrated therein how the end cap 30 of FIGS. 2, 3 and 5A is removable and the gears 19, 20 and 21 are thereafter removable without entry into the drive pump compartment 14. Briefly, the end cap 30 is fastened in place by bolts 44. The shaft 22, 23 and 32 are bearingly mounted to the end of the drive pump compartment 14 at bearings 66, 68 and 70 respectively. With respect to gears 19 and 20 a nut 72 or 74 respectively is removed whereby the gears 19 and 20 are simply slid leftwardly off of the respective ends of the shafts 22 and 23. With respect to gear 21, the splining of the shaft 13 and 32 thereto is exactly as is shown in FIG. 7 if one considers the bearing 70 to correspond with the bearing 60 in FIG. 7 and the end of the drive pump compartment 14 to support said bearing 70. Thus, one simply removes the bolts 44 and then removes the end plate 30 therewith. The gears 19 and 20 are removed by removing the nuts 72 and 74 and sliding these gears off of the gear connection thereto. The gear 21 is removed by removing it from the splined end 56 of the shaft 13 and from the splined end 58 of the shaft 32. The external mountings of the various components in both embodiments of the invention are sufficient to allow the splined shafts 13 and 32 to be separated sufficiently to remove the gear 21 therefrom.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property or privilege is claimed are defined as follows:

1. In a vehicle comprising a frame, ground-engaging means for propelling said vehicle over the ground, an engine mounted on the frame and having a drive shaft with a drive gear driven thereby, said drive shaft extending from said engine, a pair of hydrostatic motor means for driving the ground-engaging means, conduit means communicating with the hydrostatic motor means, a hydrostatic drive pump compartment structure mounted on the frame, a pair of hydrostatic pump means disposed within said pump compartment structure, mechanical adjustment means for individually controlling displacement of each of said pair of hydrostatic pump means, mechanical linkage means for simultaneously controlling the displacements of both of said pair of hydrostatic pump means and mechanical drive means disposed on said pump compartment structure for driving said hydrostatic pump means, an improvement comprising: using as said mechanical drive means:
   a first pair of gears, each of said first pair of gears being meshed with and driven by said drive gear;
   means for removably mounting each of said first pair of gears externally to said pump compartment structure;
   a pair of pump drive shafts; and
   means for removably drivingly connecting each of said pump drive shafts to a respective one of said pair of gears, said pump drive shafts passing into said pump compartment structure and driving a respective one of said pair of hydrostatic pump means;
   using as said pair of hydrostatic motor means;
   a pair of hydrostatic motors mounted externally of said hydrostatic drive pump compartment adjacent to said ground-engaging means; and
   using as said conduit means;
   pipe means which interconnect said pair of hydrostatic motors each respectively with a respective one of said pair of hydrostatic pump means.

2. An improvement as in claim 1, wherein said pump drive shafts are of unequal length and said pair of hydrostatic pump means are in staggered alignment.

3. An improvement as in claim 2, wherein said drive gear and said first pair of gears are mounted within a removable housing which is mountable to said pump compartment structure.

4. An improvement as in claim 3, wherein said pump compartment structure is removably mounted on said frame.

5. An improvement as in claim 1, wherein said pump drive shafts are of equal length and said pair of hydrostatic pump means are aligned side by side.

6. An improvement as in claim 5, including:
   a housing in enclosing relation about said drive gear and said first pair of gears; and
   means for removably mounting said housing to said pump compartment structure.

7. An improvement as in claim 6, wherein said pump compartment structure is removably mounted on said frame.

8. An improvement as in claim 1, wherein said pipe means comprise first pipe means internal of said hydrostatic pump compartment, second pipe means external of said hydrostatic drive pump compartment and means releasably securing said first and second pipe means in flow communicating relation.

9. An improvement as in claim 1, including:
   a shaft coaxial with said engine drive shaft and said drive gear, said shaft extending within said hydrostatic drive compartment and including means removably securing said shaft to said drive gear; and
   a replenishing pump mounted within said hydrostatic drive pump compartment and driven by said shaft therewithin.

10. An improvement as in claim 1, including an end cap removably attached to said pump compartment structure enclosing said first pair of gears.

* * * * *